(12) United States Patent
Watarai

(10) Patent No.: US 9,199,690 B2
(45) Date of Patent: Dec. 1, 2015

(54) BICYCLE SUSPENSION SYSTEM

(71) Applicant: Shimano Inc., Sakai, Osaka (JP)

(72) Inventor: Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/141,865

(22) Filed: Dec. 27, 2013

(65) Prior Publication Data
US 2015/0183486 A1 Jul. 2, 2015

(51) Int. Cl.
*B62K 25/04* (2006.01)
*B62J 99/00* (2009.01)

(52) U.S. Cl.
CPC ............. *B62K 25/04* (2013.01); *B62J 99/00* (2013.01); *B62J 2099/002* (2013.01); *B62K 2025/044* (2013.01); *B62K 2207/00* (2013.01)

(58) Field of Classification Search
CPC ... B62K 25/04; B62K 2025/044; B62J 99/00; B62J 2099/002
USPC ............................. 701/37; 280/283; 188/282.4
See application file for complete search history.

(56) References Cited

U.S. PATENT DOCUMENTS

| | | | |
|---|---|---|---|
| 5,254,044 A * | 10/1993 | Anderson | 474/70 |
| 6,619,684 B2 | 9/2003 | Miyoshi | |
| 2005/0215369 A1 * | 9/2005 | Fukuda et al. | 474/82 |
| 2007/0281828 A1 * | 12/2007 | Rice | 482/4 |
| 2010/0218633 A1 * | 9/2010 | Ichida et al. | 74/473.12 |
| 2010/0327542 A1 * | 12/2010 | Hara et al. | 280/5.503 |
| 2012/0253599 A1 * | 10/2012 | Shirai | 701/37 |
| 2012/0277962 A1 * | 11/2012 | Ingram et al. | 701/51 |
| 2013/0267376 A1 * | 10/2013 | Takachi | 477/3 |
| 2014/0060212 A1 * | 3/2014 | Tetsuka et al. | 73/862.627 |
| 2014/0209439 A1 * | 7/2014 | Kosaka et al. | 200/61.54 |
| 2014/0224055 A1 * | 8/2014 | Cracco et al. | 74/473.12 |

* cited by examiner

*Primary Examiner* — Marthe Marc-Coleman
(74) *Attorney, Agent, or Firm* — Global IP Counselors

(57) ABSTRACT

A bicycle suspension system includes a control unit, a velocity sensor, and a cadence sensor. The control unit is configured to obtain gear ratio information of a bicycle to control an operating state of a suspension of the bicycle based on the gear ratio information. The velocity sensor is configured to detect a forward velocity of the bicycle and output a signal indicative of the forward velocity to the control unit. The cadence sensor is configured to detect a cadence of the bicycle crank and output a signal indicative of the cadence to the control unit. The control unit is configured to obtain the gear ratio information based on the forward velocity and the cadence.

21 Claims, 7 Drawing Sheets

|  | Teeth Numbers of Rear Sprockets | | | | | | | | |
| --- | --- | --- | --- | --- | --- | --- | --- | --- | --- |
|  |  | 12 | 13 | 14 | 15 | 16 | 17 | 19 | 21 | 23 |
| Teeth Numbers of Front Sprockets | 30 | 2.50 | 2.31 | 2.14 | 2.00 | 1.88 | 1.76 | 1.58 | 1.43 | 1.30 |
|  | 39 | 3.25 | 3.00 | 2.79 | 2.60 | 2.44 | 2.29 | 2.05 | 1.86 | 1.70 |
|  | 53 | 4.42 | 4.08 | 3.79 | 3.53 | 3.31 | 3.12 | 2.79 | 2.52 | 2.30 |

BICYCLE SUSPENSION SYSTEM

BACKGROUND

1. Field of the Invention

The present invention generally relates to a bicycle suspension system. More specifically, the present invention relates to a bicycle suspension system for a bicycle.

2. Background Information

Various forms of suspension systems have been developed for bicycles. Bicycles, especially mountain bikes (MTB) and all terrain bikes (ATB), have been outfitted with front and/or rear suspension assemblies and systems to absorb the shock that would have been transmitted to the rider when riding on a rough road. These suspension assemblies range from very simple to very complex.

A conventional bicycle suspension system is well known with which a bicycle suspension is controlled to change its stiffness based on a gear position signal outputted by a gear position sensor (see U.S. Pat. No. 6,619,684, for example).

SUMMARY

Generally, the present disclosure is directed to various features of a bicycle suspension system that is configured to operate a bicycle suspension. In the conventional bicycle suspension system, the bicycle suspension is basically controlled based on the gear position signal outputted by the gear position sensor.

In view of the state of the known technology, one object of the present disclosure is to provide a bicycle suspension system that is configured to operate a bicycle suspension without a gear position sensor.

In accordance with a first aspect of the present invention, a bicycle suspension system is provided that basically comprises a control unit, a velocity sensor, and a cadence sensor. The control unit is configured to obtain gear ratio information of a bicycle to control an operating state of a suspension of the bicycle based on the gear ratio information. The velocity sensor is configured to detect a forward velocity of the bicycle and output a signal indicative of the forward velocity to the control unit. The cadence sensor is configured to detect a cadence of the bicycle crank and output a signal indicative of the cadence to the control unit. The control unit is configured to obtain the gear ratio information based on the forward velocity and the cadence.

In accordance with a second aspect of the present invention, the bicycle suspension system according to the first aspect is configured such that the control unit is programmed to set the suspension to a first operating state while the gear ratio information indicates that the gear ratio is within a predetermined condition and to set the suspension to a second operating state while the gear ratio information indicates that the gear ratio is not within the predetermined condition.

In accordance with a third aspect of the present invention, the bicycle suspension system according to the second aspect is configured such that the control unit is programmed to set the suspension to the first operating state while the gear ratio information indicates that the gear ratio is not greater than a predetermined value.

In accordance with a fourth aspect of the present invention, the bicycle suspension system according to the first aspect is provided that further comprises a data storage device operatively coupled to the control unit, the data storage device having data stored relating to the bicycle, the data stored including a tire circumference. The control unit is programmed to obtain the gear ratio information based on the forward velocity, the cadence and the tire circumference.

In accordance with a fifth aspect of the present invention, the bicycle suspension system according to the fourth aspect is configured such that the data stored of the data storage device includes teeth number of at least one front sprocket and teeth number of at least one rear sprocket. The control unit is programmed to obtain gear position information based on the gear ratio information, the teeth number of at least one front sprocket and the teeth number of at least one rear sprocket.

In accordance with a sixth aspect of the present invention, the bicycle suspension system according to the fifth aspect is configured such that the control unit is programmed to set the suspension to a first operating state while the gear position information indicates that the gear ratio is within a predetermined condition and to set the suspension to a second operating state while the gear position information indicates that the gear ratio is not within the predetermined condition.

In accordance with a seventh aspect of the present invention, the bicycle suspension system according to the sixth aspect is configured such that the data stored of the data storage device includes the teeth number of a plurality of front sprockets. The control unit is programmed to set the suspension to the first operating state while the gear position information indicates that a chain is engaged with one of the front sprockets that has a lowest teeth number among the front sprockets.

In accordance with an eighth aspect of the present invention, the bicycle suspension system according to the sixth aspect is configured such that the data stored of the data storage device includes the teeth number of a plurality of rear sprockets. The control unit is programmed to set the suspension to the first operating state while the gear position information indicates that a chain is engaged with one of the rear sprockets that has a largest teeth number among the rear sprockets.

In accordance with a ninth aspect of the present invention, the bicycle suspension system according to the sixth aspect is configured such that the data stored of the data storage device includes the teeth number of a plurality of front sprockets. The control unit is programmed to set the suspension to the first operating state while the gear position information indicates that a chain has moved from a first one of the front sprockets to a second one of the front sprockets, which has a smaller number of teeth than the first one of the front sprockets.

In accordance with a tenth aspect of the present invention, the bicycle suspension system according to the fifth aspect is configured such that the data stored of the data storage device includes the teeth number of a plurality of front sprockets and the teeth number of a plurality of rear sprockets. The control unit is programmed to determine which one of the front sprockets and which one of the rear sprockets is engaged with a chain based on the gear position information.

In accordance with an eleventh aspect of the present invention, the bicycle suspension system according to the sixth aspect is configured such that the data stored of the data storage device includes the teeth number of a plurality of rear sprockets. The control unit is programmed to set the suspension to the first operating state while the gear position information indicates that a chain has moved from a first one of the rear sprockets to a second one of the rear sprockets, which has a greater number of teeth than the first one of the rear sprockets.

In accordance with a twelfth aspect of the present invention, the bicycle suspension system according to the sixth aspect is configured such that the data stored of the data storage device includes the teeth number of a plurality of front sprockets and the teeth number of a plurality of rear sprockets. The control unit is programmed to set the suspension to the first operating state while the gear position information indicates that that a chain is engaged with both one of the front sprockets that has a lowest teeth number among the front sprockets and one of the rear sprockets that has a next to largest teeth number among the rear sprockets.

In accordance with a thirteenth aspect of the present invention, the bicycle suspension system according to the second aspect is configured such that the suspension is configured to be prevented from expanding and contracting in the first operating state, and the suspension is configured to expand and contract in the second operating state.

In accordance with a fourteenth aspect of the present invention, the bicycle suspension system according to the second aspect is configured such that the suspension is configured to expand and contract in the first and second operating states, and an amount of expansion and contraction is larger than the first operating state in the second operating state.

In accordance with a fifteenth aspect of the present invention, the bicycle suspension system according to the second aspect is configured such that the suspension is configured to be prevented from damping impact on the bicycle in the first operating state, and the suspension is configured to damp impact on the bicycle in the second operating state.

In accordance with a sixteenth aspect of the present invention, the bicycle suspension system according to the second aspect is configured such that the suspension is configured to damp impact on the bicycle in the first and second operating states, and a rate of damping impact is larger than the first operating state in the second operating state.

In accordance with a seventeenth aspect of the present invention, the bicycle suspension system according to the sixth aspect is configured such that the suspension is configured to be prevented from expanding and contracting in the first operating state, and the suspension is configured to expand and contract in the second operating state.

In accordance with an eighteenth aspect of the present invention, the bicycle suspension system according to the sixth aspect is configured such that the suspension is configured to expand and contract in the first and second operating states, and an amount of expansion and contraction is larger than the first operating state in the second operating state.

In accordance with a nineteenth aspect of the present invention, the bicycle suspension system according to the sixth aspect is configured such that the suspension is configured to be prevented from damping impact on the bicycle in the first operating state, and the suspension is configured to damp impact on the bicycle in the second operating state.

In accordance with a twentieth aspect of the present invention, the bicycle suspension system according to the sixth aspect is configured such that the suspension is configured to damp impact on the bicycle in the first and second operating states, and a rate of damping impact is larger than the first operating state in the second operating state.

Other objects, features, aspects and advantages of the disclosed bicycle suspension system will become apparent to those skilled in the art from the following detailed description, which, taken in conjunction with the annexed drawings, discloses one embodiment of the bicycle suspension system.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
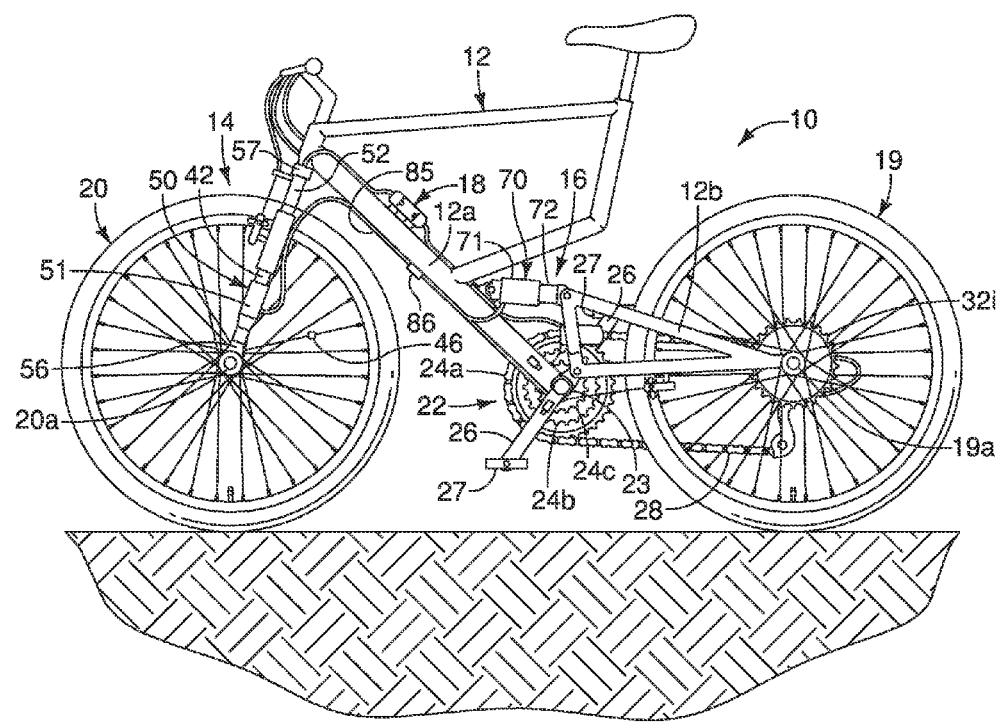
FIG. 1 is an elevational view of a bicycle having front and rear suspension assemblies that are controlled by a bicycle suspension system in accordance with one embodiment.

Referring initially to FIG. 1, a bicycle 10 is illustrated in accordance with one embodiment. The bicycle 10 has a frame 12, a front suspension assembly 14, a rear suspension assembly 16 and a computer or control unit 18. While the bicycle 10 is illustrated as a mountain bike, it will be apparent to those skilled in the art from this disclosure that the present invention can be applied to other types of bicycles such as a road bike.

Figure 2:
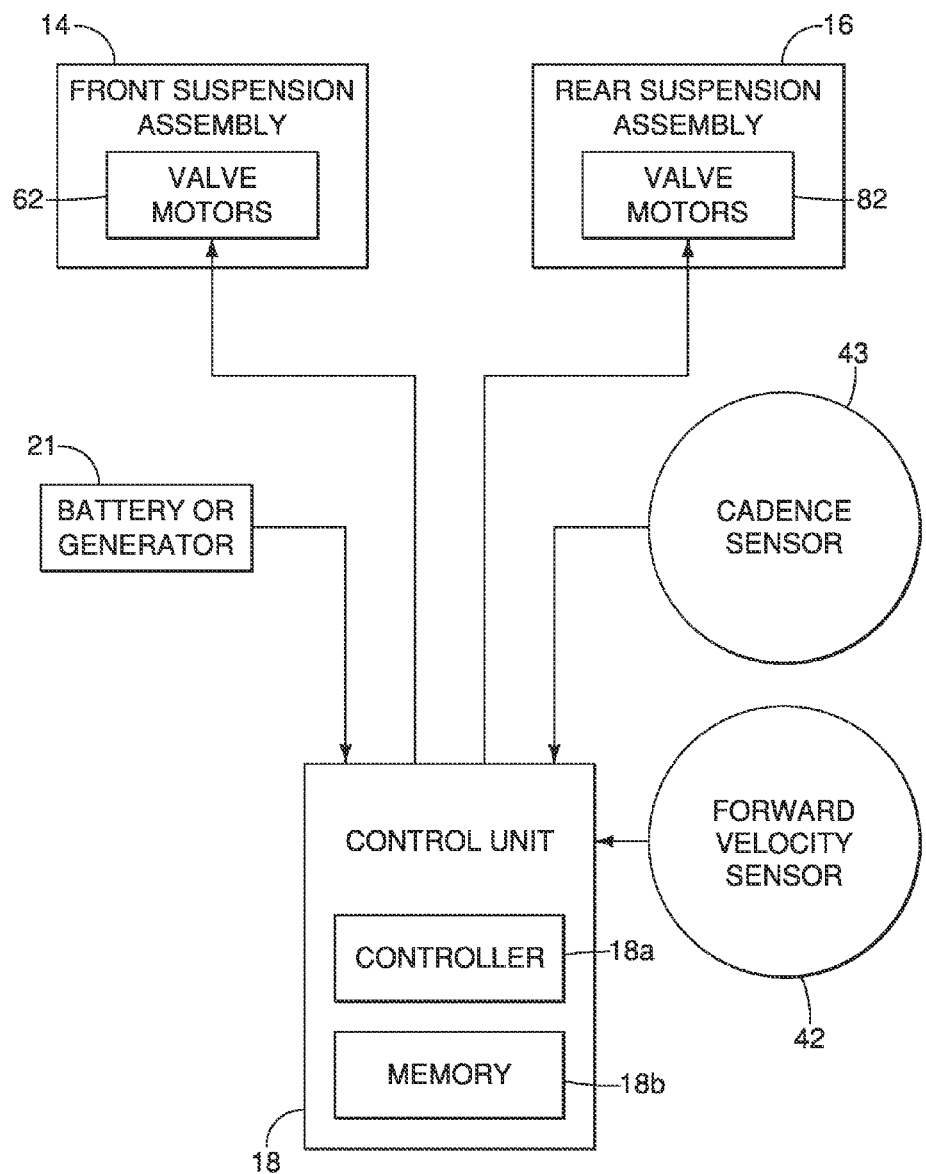
FIG. 2 is a block diagram illustrating the bicycle suspension system for controlling the front and rear suspension assemblies.

The control unit 18 can be installed internally or externally of a part of the bicycle 10. The control unit 18 is a small conventional computer device with a central processing unit (CPU) that is operatively connected to the front and rear suspension assemblies 14 and 16, respectively, for controlling their stiffnesses based on various bicycle information as discussed below. Specifically, in the illustrated embodiment, as shown in FIG. 2, the control unit 18 basically includes a controller or CPU 18a and a data storage device or memory 18b. The control unit 18 can further include conventional components such as an input interface circuit, an output interface circuit, and storage devices such as a ROM (Read Only Memory) device and a RAM (Random Access Memory) device as needed and/or desired. It will be apparent to those skilled in the art from this disclosure that the precise structure and algorithms for the control unit 18 can be any combination of hardware and software that will carry out the functions of the present invention.

As shown in FIG. 1, in the illustrated embodiment, the bicycle 10 further includes a rear wheel 19 rotatably coupled about rear hub 19a, a front wheel 20 rotatably coupled about front hub 20a and a drive train assembly 22 for propelling bicycle 10. The drive train assembly 22 basically includes a bottom bracket 23, a plurality of (three in this embodiment) front chain rings or sprockets 24a to 24c (see FIG. 9), a pair of crank arms 26 with pedals 27, a drive chain 28 and a plurality of (nine in this embodiment) rear sprockets 32a to 32i (see FIG. 9) coupled to rear hub 19a of rear wheel 19 in a conventional manner. Since these parts of bicycle 10 are well known in the art, these parts will not be discussed or illustrated in detail herein, except as they are modified to be used in conjunction with the present invention. Moreover, various conventional bicycle parts such as brakes, derailleurs, additional sprocket, etc., which are not illustrated and/or discussed herein, can be used in conjunction with the present invention.

In the illustrated embodiment, the control unit 18 selectively transmits electrical signals to the front and rear suspension assemblies 14 and 16 to control their stiffnesses. The front and rear suspension assemblies 14 and 16 will either stiffen or soften accordingly based on the signals received from the control unit 18. A battery or generator 21 (see FIG. 2) is preferably used to supply electrical power to the control unit 18. In the illustrated embodiment, both the front and rear suspension assemblies 14 and 16 are controlled by the control unit 18 based on the signals. However, it will be apparent to those skilled in the art from this disclosure that only one of the front and rear suspension assemblies 14 and 16 can be controlled by the control unit 18 in the same manner.

As illustrated in FIG. 2, the control unit 18 is electrically coupled to a plurality of sensors 42 and 43 to determine when to electronically adjust the front and rear suspension assemblies 14 and 16 in response to various factors or conditions. Preferably, the sensors 42 and 43 for this embodiment include a forward velocity sensor 42 (e.g., a velocity sensor), and a cadence or crank speed sensor 43. These sensors 42 and 43 are electrically coupled to the control unit 18 by electrical wires in a conventional manner for inputting various electrical signals, which are indicative of certain conditions. The signals from the sensors 42 and 43 are preferably electrical signals that are utilized by the control unit 18 to determine or calculate various conditions for controlling the front and rear suspension assemblies 14 and 16. Of course, more or other types of conventional bicycle sensors, such as an accelerometer, a pedaling torque sensor and the like, can be used as needed and/or desired depending on the type of suspension assemblies used and/or the factors/conditions desired for adjusting the stiffness of the front and rear suspension assemblies 14 and 16. The control unit 18 can also be connected to these sensors located on other parts of the bicycle 10 to sense other riding factors. However, in the illustrated embodiment, the bicycle 10 does not need to include gear position sensors for detecting the gear positions of the front and rear suspension assemblies 14 and 16. In the illustrated embodiment, the control unit 18 is programmable either by the rider or by the bicycle manufacturer such that the stiffness of the front and rear suspension assemblies 14 and 16 will be adjusted based on one or more of the various parameters that have been sensed and calculated.

As shown in FIG. 1, the velocity sensor 42 is utilized to determine the forward velocity of the bicycle 10. This velocity sensor 42 utilizes a magnet 46 that is attached to a spoke of the front wheel 20. The velocity sensor 42 is a device that senses the magnet 46 for determining the revolutions per unit of time (e.g., per minute) of the wheel 20. Since the velocity sensor 42 that senses the magnet 46 attached to the spoke of the front wheel 20 is conventionally well known in the bicycle field, the detailed configuration of the velocity sensor 42 will be omitted for the sake of brevity. As shown in FIG. 2, the velocity sensor 42 is electrically coupled to the control unit 18. With this configuration, the velocity sensor 42 is configured to detect the forward velocity of the bicycle 10 and output the signal indicative of the forward velocity to the control unit 18. In particular, in the illustrated embodiment, the velocity sensor 42 outputs the revolutions per minute of the wheel 20 to the control unit 18 that is indicative of the forward velocity of the bicycle 10.

Figure 6:
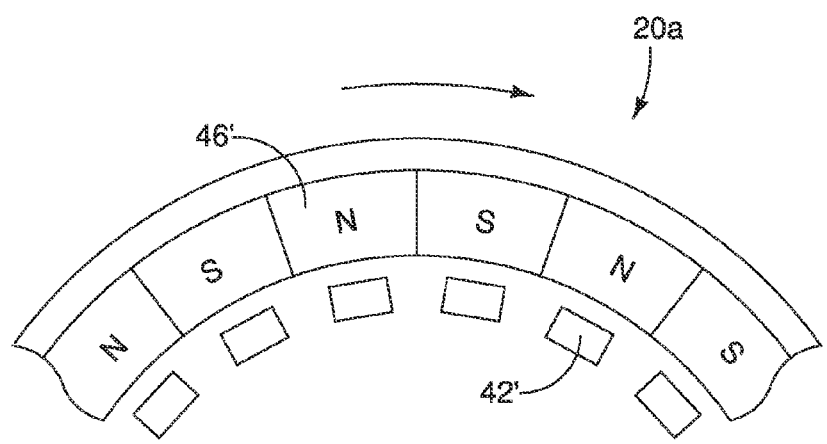
FIG. 6 is a diagrammatic view of the hub dynamo illustrated in FIG. 6, illustrating the velocity sensor of the bicycle.
Figure 7:
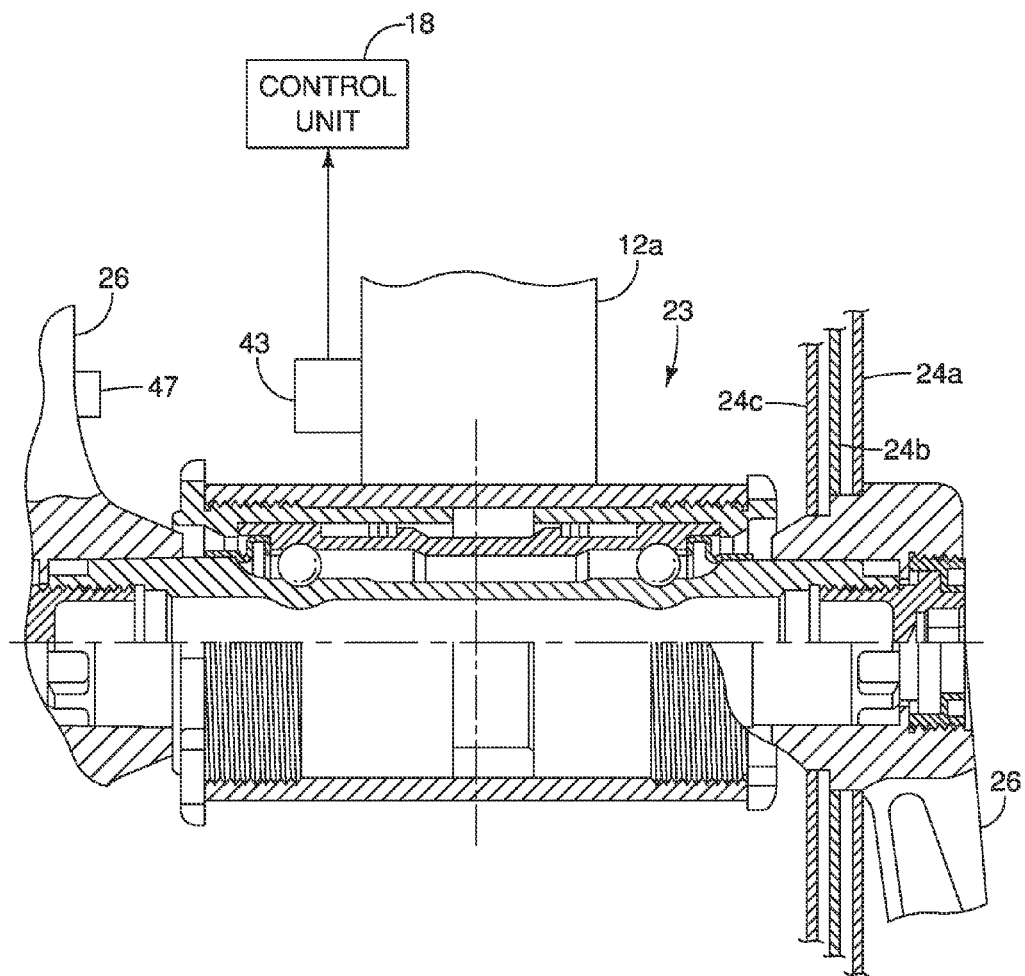
FIG. 7 is a cross-sectional view of the bottom bracket of the bicycle illustrated in FIG. 1, illustrating a cadence sensor of the bicycle.

Alternatively or additionally, the forward velocity can also be obtained from measurements of an accelerometer of the bicycle. In particular, the forward velocity is determined by the control unit 18 using an integration of the acceleration in the horizontal direction. Furthermore, alternatively or additionally, as seen in FIGS. 6 and 7, the front hub 20a can have a velocity sensor 42'. In this case, the front hub 20a is formed as hub dynamo that generates AC voltage, which is indicative of the forward velocity. In particular, the housing of the front hub 20a has a plurality of circumferentially spaced apart magnets 46' that are located adjacent to a stator yoke of the front hub 20a. Thus, the magnets 46' and the stator yoke of the front hub 20a form the velocity sensor 42', which sends AC voltage as a speed signal. The AC voltage from the velocity sensor 42' indicates the revolutions per unit of time of the front hub 20a by sensing how often the plus pole and minus pole changed per time. Thus, the control unit 18 utilizes AC voltage for calculating the forward velocity of bicycle 10.

As shown in FIG. 7, the cadence sensor 43 is utilized to determine the cadence of the bicycle 10. Specifically, the cadence sensor 43 includes a crank speed sensor to sense the revolutions per unit of time (e.g., per minute) of the crank arms 26. As seen in FIG. 7, the cadence sensor 43 is mounted to a portion of a main frame 12a of the frame 12, and utilizes a magnet 47 mounted to one of the crank arms 26 for measuring revolutions per unit of time of the crank arms 26. Since the cadence sensor 43 that senses the magnet 47 attached to the crank arm 26 is conventionally well known in the art, the detailed configuration of the cadence sensor 43 will be omitted for the sake of brevity. As shown in FIG. 2, the cadence sensor 43 is electrically coupled to the control unit 18. With this configuration, the cadence sensor 43 is configured to detect the cadence of the crank arms 26 (e.g., bicycle cranks) and output the signal indicative of the cadence to the control unit 18. In particular, in the illustrated embodiment, the cadence sensor 43 outputs the revolutions per minute of the crank arms 26 to the control unit 18 that is indicative of the cadence of the crank arms 26.

The particular construction of the front and rear suspension assemblies 14 and 16 is not critical to the present invention. There are currently numerous types of adjustable suspensions for bicycle 10 that can be utilized to carry out the present invention. In the illustrated embodiment, the front and rear suspension assemblies 14 and 16 are conventional air shocks with a hydraulic dampening mechanism.

For the sake of simplicity, only one of the cylinders or shocks 50 from the front suspension assembly 14 will be discussed and illustrated herein. It will be apparent to those skilled in the art from this disclosure that a pair of cylinders or shocks 50 is utilized to form the front suspension assembly 14, while a single cylinder or shock 70 is utilized to form the rear suspension assembly 16. The constructions of the cylinders or shocks 50 for the front suspension assembly 14 are substantially identical to the cylinder or shock 70 for the rear suspension assembly 16, except for their sizes and shapes.

Figure 3:
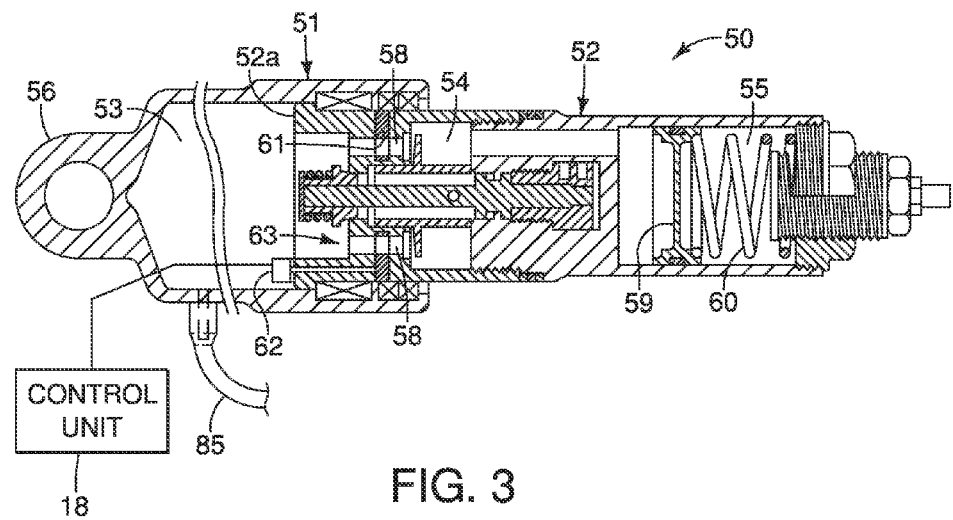
FIG. 3 is a cross-sectional view one of the front cylinders for the front suspension assembly.

As seen in FIGS. 1 and 3, each of the cylinders 50 basically includes outer and inner tubular telescoping members 51 and 52 defining inner cavities 53, 54 and 55 in the cylinder 50. The inner cavities 53 and 54 constitute lower and upper hydraulic cavities 53 and 54. The inner cavity 55 constitutes an air cavity or chamber 55. The outer tubular member 51 is coupled to the front hub 20a by a mounting member 56, while the inner tubular member 52 is coupled to the main frame 12a by a mounting member 57. The outer tubular member 51 has the lower hydraulic cavity 53 that receives the bottom end 52a of the inner tubular member 52. The bottom end 52a of the inner tubular member 52a forms a piston that has a plurality of orifices 58. The orifices 58 fluidly couple the lower and upper hydraulic cavities 53 and 54 together such that hydraulic fluid flows from the lower hydraulic cavity 53 to the upper hydraulic cavity 54, which is formed by a portion of the inner tubular member 52. The air cavity or chamber 55 of the inner tubular member 52 is formed above the upper hydraulic cavity 54.

The air chamber 55 and the upper hydraulic cavity 54 are separated by an axially slidable piston 59. Within the air chamber 55 is a coil spring 60. The stiffness of the cylinder 50 is controlled by changing the size of the orifices 58 utilizing a control disk 61 that is rotatably mounted to change the size of the orifices 58. In other words, the control disk 61 is movable to change the amount of overlapping or closing of the orifices 58. Preferably, the control disk 61 of the cylinder 50 is controlled by an electric motor 62 that rotates the control disk 61. The electric motor 62 is electrically coupled to the control unit 18 that selectively operates the electric motor 62 to adjust the stiffness of the cylinder 50. Thus, the orifices 58 and the control disk 61 form a front cylinder control valve 63 that is automatically adjusted via the control unit 18. The electric motors 62 and the front cylinder control valves 63 of the cylinders 50 form a front controller or adjustment mechanism that changes or adjusts the stiffness or softness of the front suspension assembly 14 based on the control unit 18. Of course, it will be apparent to those skilled in the art from this disclosure that other types of adjustment mechanisms can be utilized for controlling the stiffness of the cylinder 50.

Figure 4:
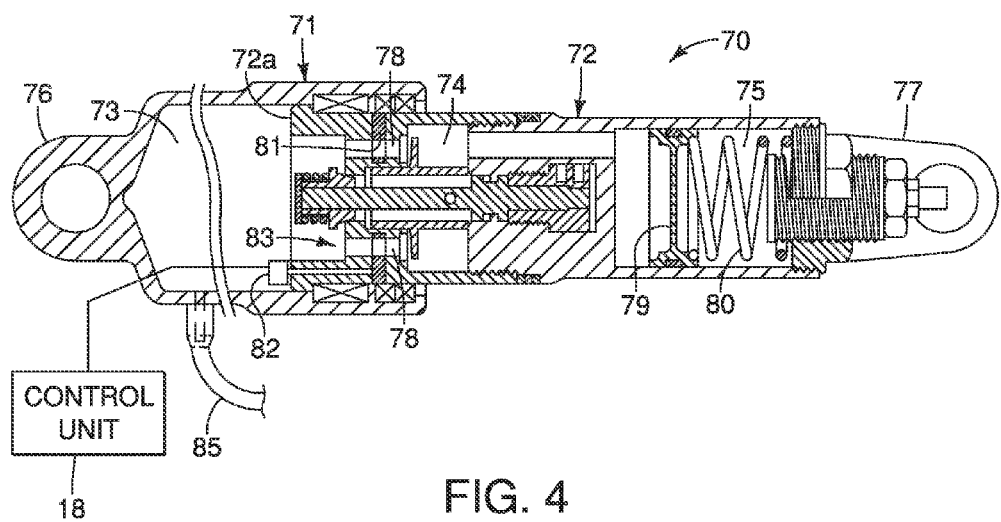
FIG. 4 is a cross-sectional view of a rear cylinder for the rear suspension assembly.
Figure 5:
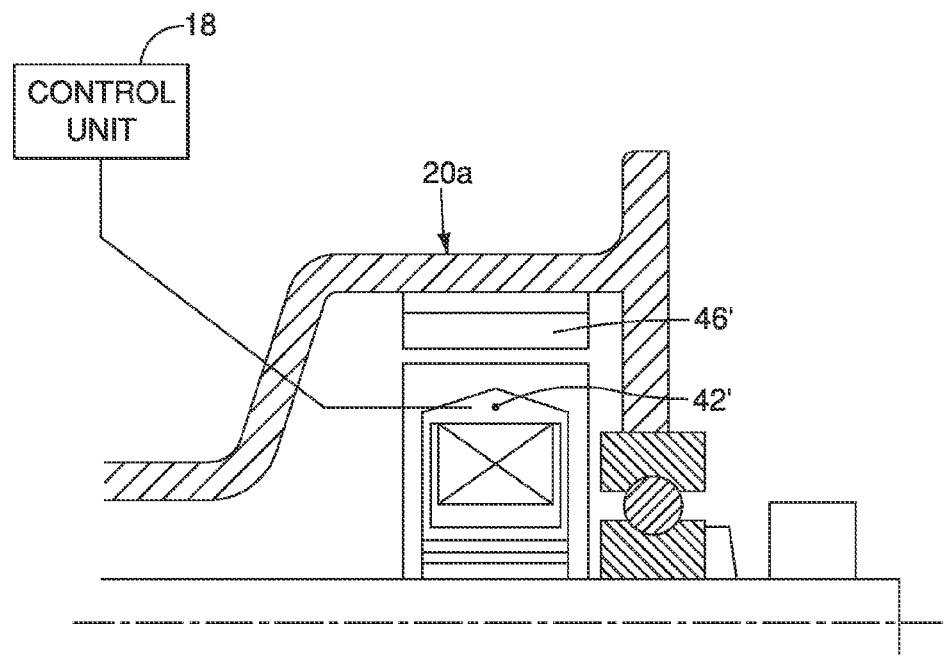
FIG. 5 is a diagrammatic illustration of a hub dynamo for either the front or rear hubs of the bicycle, illustrating a velocity sensor of the bicycle.

Similarly, as seen in FIGS. 1 and 4, the cylinder 70 basically includes outer and inner tubular telescoping members 71 and 72 defining inner cavities 73, 74 and 75 in the cylinder 70. The inner cavities 73 and 74 constitute lower and upper hydraulic cavities 73 and 74. The inner cavity 75 constitutes an air cavity or chamber 75. The outer tubular member 71 is coupled to the main frame 12a by a mounting member 76, while the inner tubular member 72 is coupled by a mounting member 77 to the rear frame 12b that is movably coupled to the main frame 12a. The outer tubular member 71 has the lower hydraulic cavity 73 that receives the bottom end 72a of the inner tubular member 72. The bottom end 72a of the inner tubular member 72a forms a piston that has a plurality of orifices 78. The orifices 78 fluidly couple the lower and upper hydraulic cavities 73 and 74 together such that hydraulic fluid flows from the lower hydraulic cavity 73 to the upper hydraulic cavity 74, which is formed by a portion of the inner tubular member 72. The air cavity or chamber 75 of the inner tubular member 72 is formed above the upper hydraulic cavity 74.

The air chamber 75 and upper hydraulic cavity 74 are separated by an axially slidable piston 79. Within the air chamber 75 is a coil spring 80. The stiffness of the cylinder 70 is controlled by changing the size of the orifices 78 utilizing a control disk 81 that is rotatably mounted to change the size of the orifices 78. In other words, the control disk 81 is movable to change the amount of overlapping or closing of the orifices 78. Preferably, the control disk 81 of the cylinder 70 is controlled by an electric motor 82 that rotates the control disk 81. The electric motor 82 is electrically coupled to the control unit 18 that selectively operates the electric motor 62 to adjust the stiffness of the cylinder 70. Thus, the orifices 78 and the control disk 81 form a rear cylinder control valve 83 that is automatically adjusted via the control unit 18. The electric motor 82 and the rear cylinder control valve 83 of the cylinder 70 form a rear controller or adjustment mechanism that changes or adjusts the stiffness or softness of the rear suspension assembly 16 based on the control unit 18. Of course, it will be apparent to those skilled in the art from this disclosure that other types of adjustment mechanisms can be utilized for controlling the stiffness of the cylinder 70.

Preferably, the lower hydraulic cavities 53 of the front cylinders 50 are fluidly connected to the corresponding hydraulic cavity 73 of the rear cylinder 70. The fluid conduit 85 connecting the front and rear hydraulic cavities 53 and 73 includes an ON/OFF valve 86 for disconnecting the flow of fluid the front and rear hydraulic cavities 53 and 73. The control unit 18 is operatively coupled to valve 86, which acts to manually fix the ride height by fixing the front and rear suspension assemblies 14 and 16. Thus, the rear suspension assembly 16 can be locked in a compressed state.

The oil or hydraulic fluid is a relatively incompressible fluid and the pistons are configured such that the oil and air provide a dampening function. Of course, this air and oil height/suspension locking mechanism can be used with traditional front and rear suspensions as needed and/or desired.

Figures 8, 9:
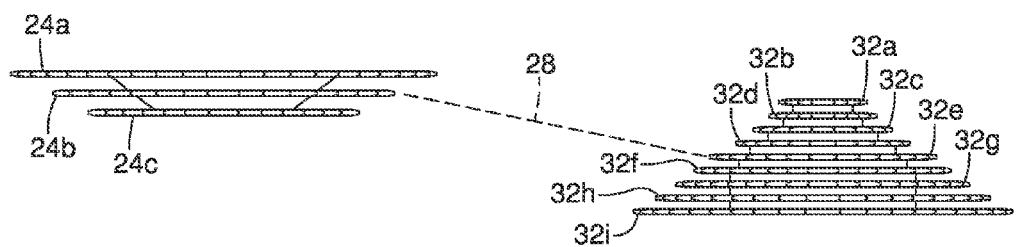
FIG. 8 is a gear ratio table stored in a memory of the bicycle suspension system.
FIG. 9 is a schematic diagram of a drive train for the bicycle illustrated in FIG. 1.
Figure 10:
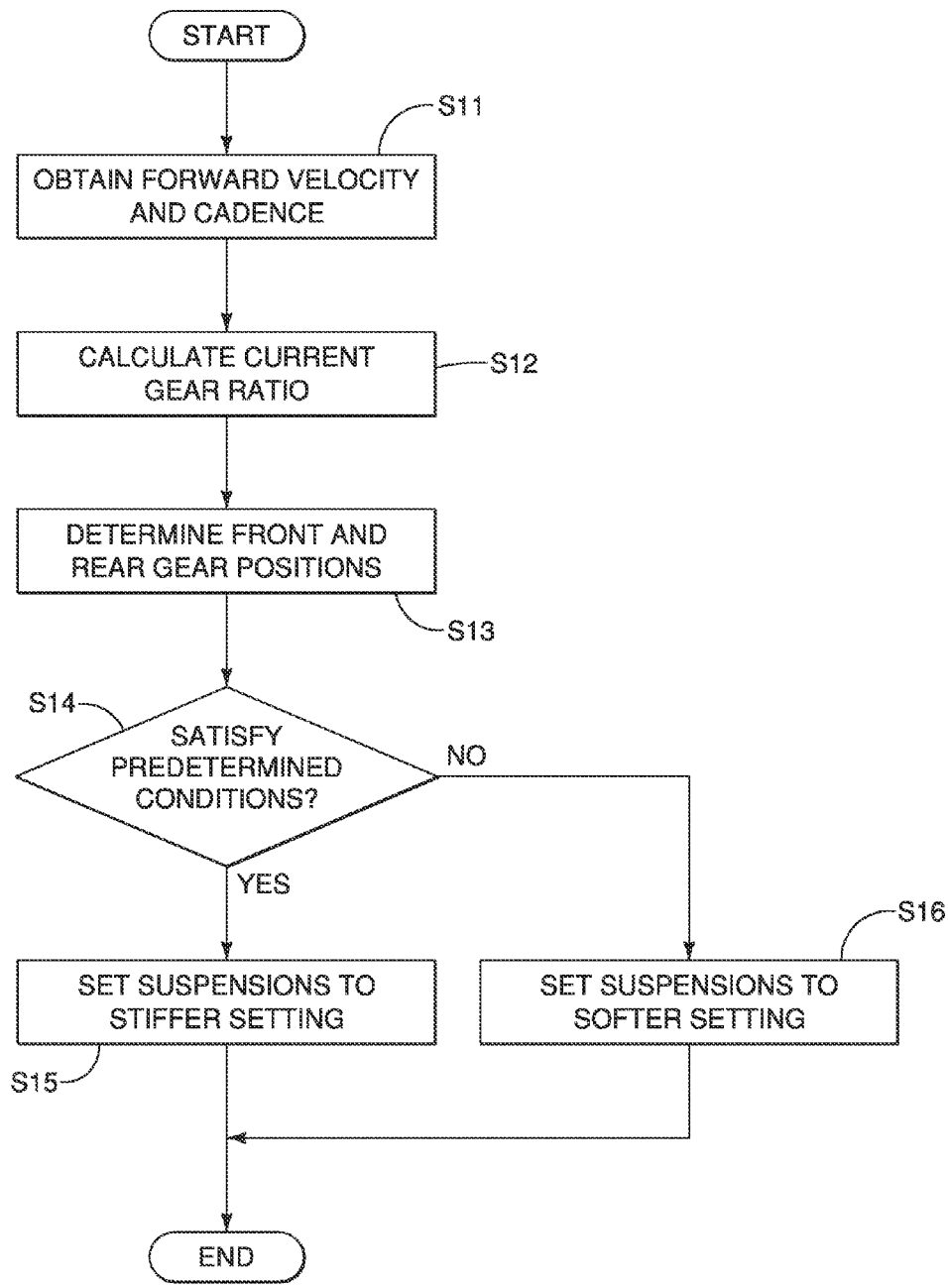
FIG. 10 is a flowchart of a suspension control for the bicycle suspension system.

Referring now to FIGS. 8 to 10, a suspension control of the bicycle suspension system will be described in detail. In the illustrated embodiment, with this suspension control of the bicycle suspension system, the control unit 18 adjusts the front and rear suspension assemblies 14 and 16 to change their stiffness without gear position sensor. In particular, the control unit 18 controls the front and rear suspension assemblies 14 and 16 based on the forward velocity of the bicycle 10 and the cadence of the crank arms 26. More specifically, in the illustrated embodiment, the controller 18a of the control unit 18 determines the gear position (e.g., a front gear position and a rear gear position) of the bicycle 10 based on the signals obtained from the sensors 42 and 43, and parameters stored in the memory 18b. Then, the controller 18a adjusts the front and rear suspension assemblies 14 and 16 based on the determined front and rear gear positions of the bicycle 10.

In the illustrated embodiment, the memory 18b stores as the parameters a tire circumference [mm], teeth numbers of the front sprockets 24a to 24c, and teeth numbers of the rear sprockets 32a to 32i. Thus, in other words, the data stored of the memory 18b (e.g., the data storage device) includes teeth number of at least one front sprocket and teeth number of at least one rear sprocket. In particular, the data stored of the memory 18b (e.g., the data storage device) includes the teeth number of a plurality of front sprockets 24a to 24c. Furthermore, the data stored of the memory 18b (e.g., the data storage device) includes the teeth number of a plurality of rear sprockets 32a to 32i. In the illustrated embodiment, the front sprockets 24a to 24c have the teeth numbers of 53T, 39T, and 30T, respectively, while the rear sprockets 32a to 32i have the teeth numbers of 12T, 13T, 14T, 15T, 16T, 17T, 19T, 21T, and 23T. In other words, as shown in FIG. 9, in the illustrated embodiment, the front sprocket 24a has the largest teeth number among the front sprockets 24a to 24c, while the front sprocket 24c has the smallest teeth number among the front sprockets 24a to 24c. Similarly, in the illustrated embodiment, the rear sprocket 32a has the smallest teeth number among the rear sprockets 32a to 32i, while the rear sprocket 32i has the largest teeth number among the rear sprockets 32a to 32i. Of course, the numbers of the front and rear sprockets 24a to 24c and 32a to 32i and the teeth numbers of the front and rear sprockets 24a to 24c and 32a to 32i are provided for illustration only, and can be different values as needed and/or desired.

Furthermore, as shown in FIG. 8, the memory 18b also has a gear ratio table. The gear ratio table stores the gear ratio values corresponding to the front and rear gear positions of the front and rear sprockets 24a to 24c and 32a to 32i. In other words, in the gear ratio table, the gear ratio values are stored in association with the combinations of the teeth numbers of the front sprockets 24*a* to 24*c* and the teeth numbers of the rear sprockets 32*a* to 32*i*, respectively. In the illustrated embodiment, twenty-seven gear ratio values are stores corresponding to twenty-seven combinations of three front sprockets 24*a* to 24*c* and nine rear sprockets 32*a* to 32*i*, respectively. Basically, the gear ratio values are values calculated by dividing the teeth numbers of the front sprockets 24*a* to 24*c* by the teeth numbers of the rear sprockets 32*a* to 32*i*, respectively. In the illustrated embodiment, the gear ratio table can be produced and stored in the memory 18*b* in response to inputting the teeth numbers of the front sprockets 24*a* to 24*c* and the teeth numbers of the rear sprockets 32*a* to 32*i* while setting up the control unit 18.

FIG. 10 is a flowchart of the suspension control of the bicycle suspension system. The suspension control shown in FIG. 10 is commenced when the rider starts riding the bicycle 10 or when the rider indicates the start of the suspension control by pressing a button on the control unit 18 or a cycle computer. The suspension control shown in FIG. 10 (from start to end) is repeatedly executed at a predetermined interval until the rider ends riding the bicycle 10 or until the rider indicates the end of the suspension control by pressing a button on the control unit 18 or the cycle computer.

As shown in FIG. 10, the controller 18*a* of the control unit 18 obtains the forward velocity of the bicycle 10 and the cadence of the crank arms 26 (step S11). As mentioned above, in the illustrated embodiment, the velocity sensor 42 outputs the revolutions per minute [rpm] of the wheel 20 to the control unit 18. The controller 18*a* calculates the forward velocity [km/h] of the bicycle 10 by multiplying the revolutions per minute [rpm] of the wheel 20 from the velocity sensor 42 by the tire circumference [mm] of the wheel 20 stored in the memory 18*b*, and by converting the speed unit of the product from [mm/m] to [km/h]. Also, in the illustrated embodiment, the cadence sensor 43 outputs the revolutions per minute [rpm] of the crank arms 26 to the control unit 18. As a result, the control unit 18 obtains the forward velocity [km/h] of the bicycle 10 and the cadence [rpm] of the crank arms 26.

The controller 18*a* of the control unit 18 then calculates a current gear ratio (e.g., the gear ratio information) of the bicycle 10 based on the following formula (step S12).

(current gear ratio)=(forward velocity [km/h]×1000000)/{(cadence [rpm]×60)×(tire circumference [mm])}

Thus, in the illustrated embodiment, the control unit 18 is configured to obtain the current gear ratio (e.g., the gear ratio information) based on the forward velocity and the cadence. In the illustrated embodiment, as described in detail later, the control unit 18 is configured to obtain the current gear ratio (e.g., the gear ratio information) of the bicycle 10 to control operating states of the front and rear suspension assemblies 14 and 16 (e.g., the suspensions) of the bicycle 10 based on the gear ratio information. Furthermore, as mentioned above, the memory 18*b* (e.g., the data storage device) is operatively coupled to the control unit 18. The memory 18*b* (e.g., the data storage device) has data stored relating to the bicycle 10. In particular, as mentioned above, the data stored includes the tire circumference. Furthermore, as shown in the formula above, in the illustrated embodiment, the control unit 18 is programmed to obtain the current gear ratio (e.g., the gear ratio information) based on the forward velocity, the cadence and the tire circumference.

Furthermore, the controller 18*a* of the control unit 18 determines the front and rear gear positions (e.g., the gear position information) based on the current gear ratio calculated in step S12 and the gear ratio table as shown in FIG. 8 (step S13). In other words, in the illustrated embodiment, the control unit 18 is programmed to obtain the front and rear gear positions (e.g., the gear position information) based on the current gear ratio (e.g., the gear ratio information), and the gear ratio table having the teeth number of at least one front sprocket and the teeth number of at least one rear sprocket. Specifically, the controller 18*a* determines whether there is an exact or close match between the current gear ratio calculated in step S12 and the gear ratio values of the gear ratio table stored in the memory 18*b*. In particular, in the illustrated embodiment, the controller 18*a* determines one of the gear ratio values of the gear ratio table that is the closest to the current gear ratio. If the controller 18*a* determines that there is an exact or close match between the current gear ratio and one of the gear ratio values of the gear ratio table, then the controller 18*a* determines a combination of one of the front sprockets 24*a* to 24*c* and one of the rear sprockets 32*a* to 32*i* that corresponds to the one of the gear ratio values of the gear ratio table, and determines the one of the front sprockets 24*a* to 24*c* as the front gear position and the one of the rear sprockets 32*a* to 32*i* as the rear gear position. In other words, in the illustrated embodiment, the control unit 18 is programmed to determine which one of the front sprockets 24*a* to 24*c* and which one of the rear sprockets 32*a* to 32*i* is engaged with the chain 28 based on the front and rear gear positions (e.g., the gear position information). For example, if the current gear ratio calculated in step S12 is 2.44, then, as shown in FIG. 9, the controller 18*a* determines that the front sprocket 24*b* with the teeth number of 39T and the rear sprocket 32*e* with the teeth number of 16T are currently engaged with the chain 28. The controller 18*a* then stores as the current gear positions the front and rear gear positions as now determined in the memory 18*b*. The controller 18*a* further stores as the previous gear positions the front and rear gear positions that are previously determined during the previous loop of the suspension control and are previously stored in the memory 18*b*.

In the illustrated embodiment, if the controller 18*a* determines that there is a plurality of exact or close matches between the current gear ratio calculated in step S12 and a plurality of the gear ratio values of the gear ratio table corresponding to a plurality of combinations of the front and rear gear positions, then the controller 18*a* determines the current gear positions corresponding to the current gear ratio by utilizing the previous gear positions. Specifically, the controller 18*a* determines as the current gear positions one of the combinations of the front and rear gear positions, which is the closest to the previous gear positions. For example, in the illustrated embodiment, as shown in FIG. 8, the gear ratio table includes two gear ratio values of 2.79 corresponding to two combinations of the front and rear gear positions, such as a first combination of the front sprocket 24*a* with the teeth number of 53T and the rear sprocket 32*g* with the teeth number of 19T, and a second combination of the front sprocket 24*b* with the teeth number of 39T and the rear sprocket 32*c* with the teeth number of 14T. If the current gear ratio calculated in step S12 is 2.79, then in step S13, the controller 18*a* determines the current gear positions based on the previous gear positions. Specifically, the controller 18*a* determines one of the first and second combinations of the front and rear gear positions, which is closer to the previous gear positions, as the current gear positions.

More specifically, in step S13, the controller 18*a* calculates a first distance between the previous gear positions and the first combination of the front and rear gear positions, and a second distance between the previous gear positions and the second combination of the front and rear gear positions. These distances are calculated as distances on the gear ratio table shown in FIG. 8, respectively. In particular, the controller 18a calculates the first distance by adding a row number difference in the gear ratio table between a row number of the gear ratio value of the previous gear positions and a row number of the gear ratio value of the first combination of the front and rear gear positions, and a column number difference in the gear ratio table between a column number of the gear ratio value of the previous gear positions and a column number of the gear ratio value of the first combination of the front and rear gear positions. The controller 18a also calculates the second distance for the second combination of the front and rear gear positions in the same manner. Then, in step S13, the controller 18a determines a smaller one of the first and second distances, and determines one of the first and second combinations of the front and rear gear positions corresponding to the smaller one of the first and second distances as the current gear position.

For example, in the illustrated embodiment, if the current gear ratio calculated in step S12 is 2.79, and the previous gear positions stored in the memory 18b are the front sprocket 24b with the teeth number of 39T and the rear sprocket 32e with the teeth number of 16T, then the controller 18a determines that the first distance to the first combination of the front sprocket 24a with the teeth number of 53T and the rear sprocket 32g with the teeth number of 19T is "3" (i.e., the row number difference is "1," and the column number difference is "2" (see FIG. 8)), and that the second distance to the second combination of the front sprocket 24b with the teeth number of 39T and the rear sprocket 32c with the teeth number of 14T is "2" (i.e., the row number difference is "0," and the column number difference is "2" (see FIG. 8)). As a result, the controller 18a determines the second combination of the front and rear gear positions corresponding to the smaller one of the first and second distances as the current gear position. On the other hand, if the first and second distances are equal to each other, then the controller 18a can further determine the current gear positions only based on the row number differences. Specifically, in this case, the controller 18a determines one of the first and second combinations of the front and rear gear positions corresponding to the smallest one of the row number differences. Furthermore, it will be apparent to those skilled in the art from this disclosure that the controller 18a can determiner the current gear positions in a different manner. For example, the controller 18a can determine the above-mentioned distances only based on the row number differences or only based on the column number differences.

Next, the controller 18a of the control unit 18 determines if the current gear ratio obtained in step S12 and the front and rear gear positions obtained in step S 13 satisfy at least one of the predetermined conditions for adjusting the front and rear suspension assemblies 14 and 16 (step S14). In the illustrated embodiment, if the controller 18a determines that the current gear ratio and the front and rear gear positions satisfy at least one of the predetermined conditions ("YES" in step S14), then the controller 18a adjust the stiffness of the cylinders 50 and 70 of the front and rear suspension assemblies 14 and 16 to a predetermined stiffer setting (e.g., a first operating state of the suspension) (step S15). On the other hand, if the controller 18a determines that current gear ratio and the front and rear gear positions does not satisfy all of the predetermined conditions ("NO" in step S14), then the controller 18a adjusts the stiffness of the cylinders 50 and 70 of the front and rear suspension assemblies 14 and 16 to a predetermined softer setting (e.g., a second operating state of the suspension) (step S16). In the illustrated embodiment, if the predetermined stiffer setting is set to the front and rear suspension assemblies 14 and 16, then the front and rear suspension assemblies 14 and 16 become stiffer than when the predetermined softer setting is set to the front and rear suspension assemblies 14 and 16. In other words, in the illustrated embodiment, the front and rear suspension assemblies 14 and 16 (e.g., the suspensions) are configured to expand and contract in both the stiffer and softer settings (e.g., the first and second operating states). An amount of expansion and contraction is larger than the stiffer setting (e.g., the first operating state) in the softer setting (e.g., the second operating state). Furthermore, in the illustrated embodiment, the front and rear suspension assemblies 14 and 16 (e.g., the suspensions) are configured to damp impact on the bicycle 10 in both the stiffer and softer settings (e.g., the first and second operating states). A rate of damping impact is larger than the stiffer setting (e.g., the first operating state) in the softer setting (e.g., the second operating state).

In the illustrated embodiment, the front and rear suspension assemblies 14 and 16 are set either the predetermined stiffer setting (e.g., the first operating state) or the predetermined softer setting (e.g., the second operating state). However, it will be apparent to those skilled in the art from this disclosure that three or more settings for the front and rear suspension assemblies 14 and 16 can be used.

In the illustrated embodiment, in step S14 of FIG. 10, the controller 18 determines if the current gear ratio and the front and rear gear positions satisfy the following conditions (A) to (E). In the illustrated embodiment, all of the conditions (A) to (E) are determined if they are satisfied. However, it will be apparent to those skilled in the art from this disclosure that only a part of the conditions (A) to (E) or additional conditions can be determined. Furthermore, these conditions (A) to (E) are provided for illustration only, and different conditions can be used as needed and/or desired.

The condition (A) is whether the current gear ratio determined in step S12 is not greater than a predetermined value. In the illustrated embodiment, while the current gear ratio is not greater than a predetermined value, such as 2.50 for example, then the controller 18a sets the front and rear suspension assemblies 14 and 16 to the stiffer setting. Thus, in the illustrated embodiment, the control unit 18 is programmed to set the front and rear suspension assemblies 14 and 16 (e.g., the suspensions) to the stiffer setting (e.g., the first operating state) while the gear ratio information indicates that the current gear ratio (e.g., the gear ratio) is not greater than a predetermined value.

The condition (B) is whether the chain 28 is currently engaged with one of the front sprockets 24a to 24c that has the lowest teeth number among the front sprockets 24a to 24c. In the illustrated embodiment, if the front gear position determined in step S13 indicates that the chain 28 is currently engaged with the front sprocket 24c with the lowest teeth number (30T), then the controller 18a sets the front and rear suspension assemblies 14 and 16 to the stiffer setting. Thus, in the illustrated embodiment, the control unit 18 is programmed to set the front and rear suspension assemblies 14 and 16 (e.g., the suspensions) to the stiffer setting (e.g., the first operating state) while the gear position information indicates that the chain 28 is engaged with the front sprocket 24c (e.g., one of the front sprockets that has a lowest teeth number among the front sprockets).

Alternatively, the condition (B) can instead be whether the chain 28 is currently engaged with both one of the front sprockets 24a to 24c that has the lowest teeth number among the front sprockets 24a to 24c and one of the rear sprockets 32a to 32i that has the next to largest teeth number among the rear sprockets 32a to 32i. In the illustrated embodiment, if the front and rear gear positions determined in step S13 indicate that the chain 28 is currently engaged with both the front sprocket 24c with the lowest teeth number (30T) and the rear sprocket 32h with the second largest teeth number (21T), then the controller 18a sets the front and rear suspension assemblies 14 and 16 to the stiffer setting. Thus, in the illustrated embodiment, the control unit 18 is programmed to set the front and rear suspension assemblies 14 and 16 (e.g., the suspensions) to the stiffer setting (e.g., the first operating state) while the gear position information indicates that that the chain 28 is engaged with both the front and rear sprockets 24c and 32h (e.g., one of the front sprockets that has a lowest teeth number among the front sprockets and one of the rear sprockets that has a next to largest teeth number among the rear sprockets).

The condition (C) is whether the chain 28 is currently engaged with one of the rear sprockets 32a to 32i that has the largest teeth number among the rear sprockets 32a to 32i. In the illustrated embodiment, if the rear gear position determined in step S13 indicates that the chain 28 is currently engaged with the rear sprocket 32i with the largest teeth number (23T), then the controller 18a sets the front and rear suspension assemblies 14 and 16 to the stiffer setting. Thus, in the illustrated embodiment, the control unit 18 is programmed to set the front and rear suspension assemblies (e.g., the suspensions) to the stiffer setting (e.g., the first operating state) while the gear position information indicates that the chain 28 is engaged with the rear sprocket 32i (e.g., one of the rear sprockets that has a largest teeth number among the rear sprockets).

The condition (D) is whether the chain 28 has moved from a first one of the front sprockets 24a to 24c to a second one of the front sprockets 24a to 24c, which has a smaller number of teeth than the first one of the front sprockets 24a to 24c. In particular, in the illustrated embodiment, the controller 18a compares the previous front gear position that was determined in step 13 of the previous loop of the suspension control with the current front gear position that has been determined in step 13 of the current loop of the suspension control. If the second one of the front sprockets 24a to 24c corresponding to the current gear positions has a smaller teeth number than the first one of the front sprockets 24a to 24c corresponding to the previous front gear position, then the controller 18a sets the front and rear suspension assemblies 14 and 16 to the stiffer setting. For example, if the previous gear position indicates the front sprocket 24a with the teeth number of 53T and the current gear positions indicate the front sprocket 24b with the teeth number of 39T, then the controller 18a sets the front and rear suspension assemblies 14 and 16 to the stiffer setting. Thus, in the illustrated embodiment, the control unit 18 is programmed to set the front and rear suspension assemblies 14 and 16 (e.g., the suspensions) to the stiffer setting (e.g., the first operating state) while the gear position information indicates that the chain 28 has moved from a first one of the front sprockets 24a to 24c to a second one of the front sprockets 24a to 24c, which has a smaller number of teeth than the first one of the front sprockets 24a to 24c.

The condition (E) is whether the chain 28 has moved from a first one of the rear sprockets 32a to 32i to a second one of the rear sprockets 32a to 32i, which has a greater number of teeth than the first one of the rear sprockets 32a to 32i. In particular, in the illustrated embodiment, the controller 18a compares the previous rear gear position that was determined in step 13 of the previous loop of the suspension control with the current rear gear position that has been determined in step 13 of the current loop of the suspension control. If the second one of the rear sprockets 32a to 32i corresponding to the current gear positions has a greater teeth number than the first one of the rear sprockets 32a to 32i corresponding to the previous rear gear position, then the controller 18a sets the front and rear suspension assemblies 14 and 16 to the stiffer setting. For example, if the previous gear position indicates the rear sprocket 32c with the teeth number of 14T and the current gear positions indicate the rear sprocket 32d with the teeth number of 15T, then the controller 18a sets the front and rear suspension assemblies 14 and 16 to the stiffer setting. Thus, in the illustrated embodiment, the control unit 18 is programmed to set the front and rear suspension assemblies 14 and 16 (e.g., the suspension) to the stiffer setting (e.g., the first operating state) while the gear position information indicates that the chain 28 has moved from a first one of the rear sprockets 32a to 32i to a second one of the rear sprockets 32a to 32i, which has a greater number of teeth than the first one of the rear sprockets 32a to 32i.

As mentioned above, in the illustrated embodiment, if the controller 18a determines that at least one of the conditions (A) to (E) is satisfied ("YES" in step S14), then the controller 18a adjusts the stiffness of the cylinders 50 and 70 of the front and rear suspension assemblies 14 and 16 to the predetermined stiffer setting (e.g., the first operating state of the suspension) (step S15). On the other hand, if the controller 18a determines that all of the conditions (A) to (E) are not satisfied ("NO" in step S14), then the controller 18a adjusts the stiffness of the cylinders 50 and 70 of the front and rear suspension assemblies 14 and 16 to the predetermined softer setting (e.g., the second operating state of the suspension) (step S16). In other words, in the illustrated embodiment, the control unit 18 is programmed to set the front and rear suspension assemblies 14 and 16 (e.g., the suspensions) to the stiffer setting (e.g., the first operating state) while the current gear ratio (e.g., the gear ratio information) indicates that the gear ratio is within a predetermined condition (e.g., the condition (A), for example) (step S15), and to set the front and rear suspension assemblies 14 and 16 (e.g., the suspensions) to the softer setting (e.g., the second operating state) while the current gear ratio (e.g., the gear ratio information) indicates that the gear ratio is not within the predetermined condition (e.g., the condition (A), for example) (step S16). Furthermore, in the illustrated embodiment, the control unit 18 is programmed to set the front and rear suspension assemblies 14 and 16 (e.g., the suspensions) to the stiffer setting (e.g., the first operating state) while the front and gear positions (e.g., the gear position information) indicates that the gear position is within a predetermined condition (e.g., the condition (B), (C), (D) or (E), for example) (step S15), and to set the front and rear suspension assemblies 14 and 16 (e.g., the suspensions) to the softer setting (e.g., the second operating state) while the gear position information indicates that the gear position is not within the predetermined condition (e.g., the condition (B), (C), (D) or (E)).

With this bicycle suspension system of the bicycle 10, the front and rear suspension assemblies 14 and 16 are stiffened when at least one of the conditions (A) to (E) is satisfied. For example, in a professional MTB race course, when the gear ratio information indicates that the gear ratio is low, then the control unit 18 determines the rider is climbing an uphill and automatically sets the front and rear suspension assemblies 14 and 16 to the stiffer setting (e.g., the first operating state). On the other hand, when the gear ratio information indicates that the gear ratio is high, the control unit 18 determines the rider is going downhill while pedaling and automatically sets the front and rear suspension assemblies 14 and 16 to the softer setting (e.g., the second operating state). This provides the rider more comfortable riding experience.

In the illustrated embodiment, the front and rear suspension assemblies 14 and 16 are both set to the stiffer setting (step S15) or to the softer setting (step S16). However, it will be apparent to those skilled in the art from this disclosure that the control unit 18 can be programmed to independently control the front and rear suspension assemblies 14 and 16 to make them independently stiffer and/or softer in different degrees. In other words, the front and rear suspension assemblies 14 and 16 can both be adjusted, but one of the suspension assemblies can be adjusted to be more stiff or less stiff than the other suspension assembly. Moreover, it will be apparent to those skilled in the art from this disclosure that the control unit 18 can be programmed to control only one of the front and rear suspension assemblies 14 and 16. In particular, in this case, the present invention can also be applied to a bicycle having only one of the front and rear suspension assemblies 14 and 16.

Furthermore, in the illustrated embodiment, the front and rear suspension assemblies 14 and 16 are set to expand and contract in both the stiffer setting (step S15) and the softer settings (step S16). However, it will be apparent to those skilled in the art from this disclosure that the front and/or rear suspension assemblies 14 and 16 can be set either to a locked state (e.g., a first operating state) in which the front and/or rear suspension assemblies 14 and 16 are prevented from expanding and contracting in step S15 or to an unlocked state (e.g., a second operating state) in which the front and/or rear suspension assemblies 14 and 16 can expand and contract in step S16. In this case, the locked state provides the stiffer setting of the front and rear suspension assemblies 14 and 16 than the unlocked state. Thus, in this case, the front and rear suspension assemblies 14 and 16 (e.g., the suspensions) are configured to be prevented from expanding and contracting in the locked state (e.g., the first operating state), and the front and rear suspension assemblies 14 and 16 (e.g., the suspensions) are configured to expand and contract in the unlocked state (e.g., the second operating state). Similarly, in this case, the front and rear suspension assemblies 14 and 16 (e.g., the suspensions) are configured to be prevented from damping impact on the bicycle 10 in the locked state (e.g., the first operating state), and the front and rear suspension assemblies 14 and 16 (e.g., suspensions) are configured to damp impact on the bicycle 10 in the unlocked state (e.g., the second operating state).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "attached" or "attaching", as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Also, the terms "part," "section," "portion," "member" or "element" when used in the singular can have the dual meaning of a single part or a plurality of parts. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Finally, terms of degree such as "substantially", "about" and "approximately" as used herein mean an amount of deviation of the modified term such that the end result is not significantly changed.

While only a selected embodiment has been chosen to illustrate the present invention, it will be apparent to those skilled in the art from this disclosure that various changes and modifications can be made herein without departing from the scope of the invention as defined in the appended claims. Moreover, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiment according to the present invention are provided for illustration only, and not for the purpose of limiting the invention as defined by the appended claims and their equivalents.

What is claimed is:

1. A bicycle suspension system comprising:
    a control unit configured to obtain gear ratio information of a bicycle and configured to control an operating state of a suspension of the bicycle based on the gear ratio information;
    a velocity sensor configured to detect a forward velocity of the bicycle and output a signal indicative of the forward velocity to the control unit; and
    a cadence sensor configured to detect a cadence of the bicycle crank and output a signal indicative of the cadence to the control unit,
    the control unit being configured to obtain the gear ratio information based on the forward velocity and the cadence, and to set the operating state of the suspension to at least one operating state based on the gear ratio information and based on at least one predetermined condition of the gear ratio.

2. The bicycle suspension system according to claim 1, wherein
    the at least one operating state includes a first operating state and a second operating state, the first and second operating states being different.

3. The bicycle suspension system according to claim 2, wherein
    the control unit is programmed to set the suspension to the first operating state while the gear ratio information indicates that the gear ratio is within the predetermined condition and to set the suspension to the second operating state while the gear ratio information indicates that the gear ratio is not within the predetermined condition.

4. The bicycle suspension system according to claim 3, wherein
the control unit is programmed to set the suspension to the first operating state while the gear ratio information indicates that the gear ratio is not greater than a predetermined value.

5. The bicycle suspension system according to claim 3, wherein
the suspension is configured to be prevented from expanding and contracting in the first operating state, and the suspension is configured to expand and contract in the second operating state.

6. The bicycle suspension system according to claim 3, wherein.
the suspension is configured to expand and contract in the first and second operating states, and an amount of expansion and contraction is larger than the first operating state in the second operating state.

7. The bicycle suspension system according to claim 3, wherein
the suspension is configured to be prevented from damping impact on the bicycle in the first operating state, and the suspension is configured to damp impact on the bicycle in the second operating state.

8. The bicycle suspension system according to claim 3, wherein
the suspension is configured to damp impact on the bicycle in the first and second operating states, and a rate of damping impact is larger than the first operating state in the second operating state.

9. The bicycle suspension system according to claim 1, further comprising
a data storage device operatively coupled to the control unit, the data storage device having data stored relating to the bicycle, the data stored including a tire circumference,
the control unit being programmed to obtain the gear ratio information based on the forward velocity, the cadence and the tire circumference.

10. The bicycle suspension system according to claim 9, wherein
the data stored of the data storage device includes teeth number of at least one front sprocket and teeth number of at least one rear sprocket, and
the control unit is programmed to obtain gear position information based on the gear ratio information, the teeth number of at least one front sprocket and the teeth number of at least one rear sprocket.

11. The bicycle suspension system according to claim 10, wherein
the control unit is programmed to set the suspension to the first operating state while the gear position information indicates that gear position is within the predetermined condition and to set the suspension to the second operating state while the gear position information indicates that the gear position is not within the predetermined condition.

12. The bicycle suspension system according to claim 11, wherein
the data stored of the data storage device includes the teeth number of a plurality of front sprockets, and
the control unit is programmed to set the suspension to the first operating state while the gear position information indicates that a chain is engaged with one of the front sprockets that has a lowest teeth number among the front sprockets.

13. The bicycle suspension system according to claim 11, wherein
the data stored of the data storage device includes the teeth number of a plurality of rear sprockets, and
the control unit is programmed to set the suspension to the first operating state while the gear position information indicates that a chain is engaged with one of the rear sprockets that has a largest teeth number among the rear sprockets.

14. The bicycle suspension system according to claim 11, wherein
the data stored of the data storage device includes the teeth number of a plurality of front sprockets, and
the control unit is programmed to set the suspension to the first operating state while the gear position information indicates that a chain has moved from a first one of the front sprockets to a second one of the front sprockets, which has a smaller number of teeth than the first one of the front sprockets.

15. The bicycle suspension system according to claim 11, wherein
the data stored of the data storage device includes the teeth number of a plurality of rear sprockets, and
the control unit is programmed to set the suspension to the first operating state while the gear position information indicates that a chain has moved from a first one of the rear sprockets to a second one of the rear sprockets, which has a greater number of teeth than the first one of the rear sprockets.

16. The bicycle suspension system according to claim 11, wherein
the data stored of the data storage device includes the teeth number of a plurality of front sprockets and the teeth number of a plurality of rear sprockets, and
the control unit is programmed to set the suspension to the first operating state while the gear position information indicates that that a chain is engaged with both one of the front sprockets that has a lowest teeth number among the front sprockets and one of the rear sprockets that has a next to largest teeth number among the rear sprockets.

17. The bicycle suspension system according to claim 11, wherein
the suspension is configured to be prevented from expanding and contracting in the first operating state, and the suspension is configured to expand and contract in the second operating state.

18. The bicycle suspension system according to claim 11, wherein
the suspension is configured to expand and contract in the first and second operating states, and an amount of expansion and contraction is larger than the first operating state in the second operating state.

19. The bicycle suspension system according to claim 6, wherein
the suspension is configured to be prevented from damping impact on the bicycle in the first operating state, and the suspension is configured to damp impact on the bicycle in the second operating state.

20. The bicycle suspension system according to claim 11, wherein
the suspension is configured to damp impact on the bicycle in the first and second operating states, and a rate of damping impact is larger than the first operating state in the second operating state.

21. The bicycle suspension system according to claim 10, wherein the data stored of the data storage device includes the teeth number of a plurality of front sprockets and the teeth number of a plurality of rear sprockets, and the control unit is programmed to determine which one of the front sprockets and which one of the rear sprockets is engaged with a chain based on the gear position information.

\* \* \* \* \*